United States Patent [19]

Turck

[11] E Patent Number: Re. 33,272

[45] Reissued Date of Patent: Jul. 24, 1990

[54] FILTER CARTRIDGE FOR FILTERING APPARATUSES

[76] Inventor: Ernst Turck, Peter-Parler-Strasse 33, D-8264 Waldkraiburg, Fed. Rep. of Germany

[21] Appl. No.: 372,055

[22] PCT Filed: Mar. 28, 1984

[86] PCT No.: PCT/DE84/00075

§ 371 Date: Nov. 27, 1984

§ 102(e) Date: Nov. 27, 1984

[87] PCT Pub. No.: WO84/03842

PCT Pub. Date: Oct. 11, 1984

Related U.S. Patent Documents

Reissue of:

[64] Patent No.: 4,619,676
Issued: Oct. 28, 1986
Appl. No.: 678,282
Filed: Mar. 28, 1984

[30] Foreign Application Priority Data

Mar. 31, 1983 [DE] Fed. Rep. of Germany ..... 3311863

[51] Int. Cl.[5] ..... B01D 46/12

[52] U.S. Cl. ..... 55/500; 55/521; 210/493.1

[58] Field of Search ..... 55/497, 500, 521, 528, 55/DIG. 31; 210/493.1, 493.3, 493.4

[56] References Cited

U.S. PATENT DOCUMENTS

| | | | |
|---|---|---|---|
| 2,410,371 | 10/1946 | Vokes | 55/500 |
| 3,199,275 | 8/1965 | Fesco | 55/521 |
| 3,410,062 | 11/1968 | Hart | 55/500 X |
| 4,560,477 | 12/1985 | Moldow | 210/457 |

FOREIGN PATENT DOCUMENTS

| | | | |
|---|---|---|---|
| 0067115 | 12/1982 | European Pat. Off. . | |
| 0007221 | 1/1982 | Japan | 55/521 |

*Primary Examiner*—Charles Hart
*Attorney, Agent, or Firm*—Nies, Webner, Kurz & Bergert

[57] ABSTRACT

Filter cartridge for filtering apparatuses for removing impurities from hot and/or highly pressurized flowing gases, with zig-zag formed, folded, gas-penetrated filter material whose part surfaces caused by the folding, between the fold lines, are arranged in relatively close juxtaposition to each other, wherein a preferably thin-walled plate 15 is arranged in the space between two respectively adjacent part surface 12, 13 of the filter material 11, with said plate having one straight-formed edge 16 lying in the inside of the fold 14 and one opposite lying zig-zag formed edge 17, and the bend or crest lines 18 between the two edges 16, 17 rise steadily towards the medial plane 19 of the plate 15.

5 Claims, 1 Drawing Sheet

FILTER CARTRIDGE FOR FILTERING APPARATUSES

Matter enclosed in heavy brackets [ ] appears in the original patent but forms no part of this reissue specification; matter printed in italics indicates the additions made by reissue.

The invention relates to a filter cartridge for filtering apparatuses for the removal of impurities from hot and/or highly pressurized, flowing gases, with zig-zag formed, folded, gas-penetrated filter material whose part surfaces, caused by the folding, between the fold lines, are arranged in relatively close juxtaposition to each other resulting in acute angles at the fold lines.

With the filter cartridges in question, phenolic resin-saturated fiber materials are used, in particular gas-permeable papers, fibrous webs of various types, which consists of zig-zag formed, folded strips of this material. The stability of the filter material depends on the actual material used. Filter materials of temperature-sensitive material lose stability with increasing temperature which gives disagreeable results, especially when under certain operating conditions as a result of the no longer existing stability of the filter material or the fold, the part surfaces of the filter material between the individual fold lines touch each other and possibly adhere to each other. This results in the whole active filter surface being more or less severely reduced, which leads to a considerable reduction in the performance of the filter.

The aforementioned shortcomings occur particularly when in the scope of a back cleaning of the filter material said material is subjected to a gas flow impulse in the opposite direction.

In order to counteract the aforementioned disadvantages, filter materials of paper were given a stamp with knobs or the like, which, however, are only able to be of effect for the duration of their stability. With the filters is question it provided that with higher temperatures of the gas-flow to be cleaned, the filter material is so strongly heated and softened that the knobs lose their original form and/or are pressed flat by the adhering part surfaces of a fold. This results in paper and similar filter materials being unsuitable for the filter cartridges in question. The most advantageous are webs of fibrous material which, however, on the other hand, have the disadvantage of not being stable enough in shape.

The invention is based on the task of providing a filter cartridge for filter apparatuses which does not have the aforementioned disadvantages and with which a collapsing of neighbouring part surfaces of the filter material of a fold is avoided, with the efficiency of the filter being impaired to the slightest possible degree, if at all, and which stands up to the occurring strains in all operating conditions, i.e. especially with all possible temperatures and pressures of the gas-flow to be cleaned.

For solving this task it is suggested according to the invention, to form the filter cartridge for filtering apparatuses in question in such a way that in the space between two respective adjacent part surfaces of the filter material, a preferably thin-walled plate, which can be referred to as a strip, is arranged whose one edge in the inside of the fold is rectilinear and the other, opposite-lying edge is of zig-zag formation and that the bend or crest lines between the two leading edges steadily rise towards the medial plane of the plate.

Further features of the filter cartridge formed according to the invention are to be taken from the subclaims and from the following description of a preferred embodiment of the subject matter of the invention which is shown in the FIGS. 1 to 3 of the drawing:

Figure 2:
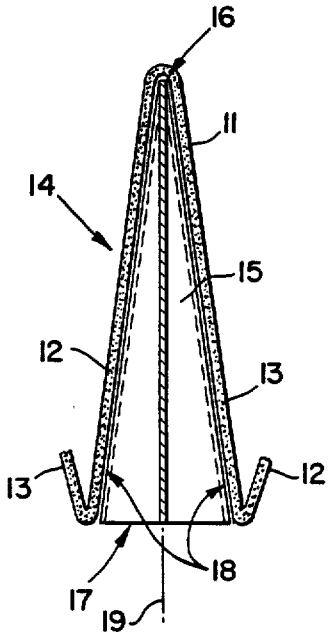
FIG. 2 is a section through a fold of the zig-zag folded filter material in which a plate according to FIG. 1 has been placed.
Figure 3:
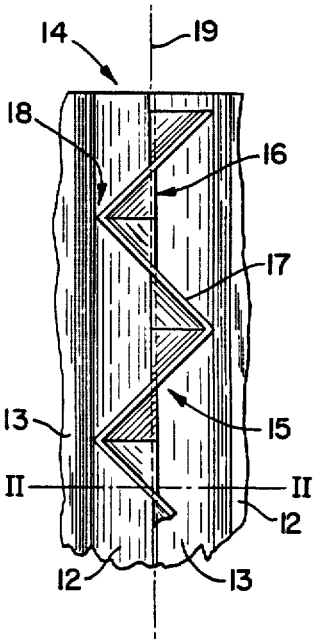
FIG. 3 is a top view on the open side of the fold of the filter material according to FIG. 2.

As FIG. 2 shows, the filter material 11 of a filter cartridge of customary design, placed in filtering apparatuses, is zig-zag folded, with the material extending from the fold lines at acute angles. The zig-zag folded filter material can be arranged along a straight line, a curved line or a circle.

The part surfaces 12, 13 of the filter material 11 form one fold respectively. The zig-zag folded filter material 11 is commonly blown against from one side, with the impurities of the gas flow remaining on the filter material or depositing in the folds 14 between the part surfaces 12 and 13 of the filter material until a certain density is reached and it becomes necessary to clean the filter material. For this purpose a gas flow is passed through the filter in the opposing direction, which removes the agglomerated impurities from the surface of the filter material, which then fall into a collecting space and can be drawn off.

Figure 1:
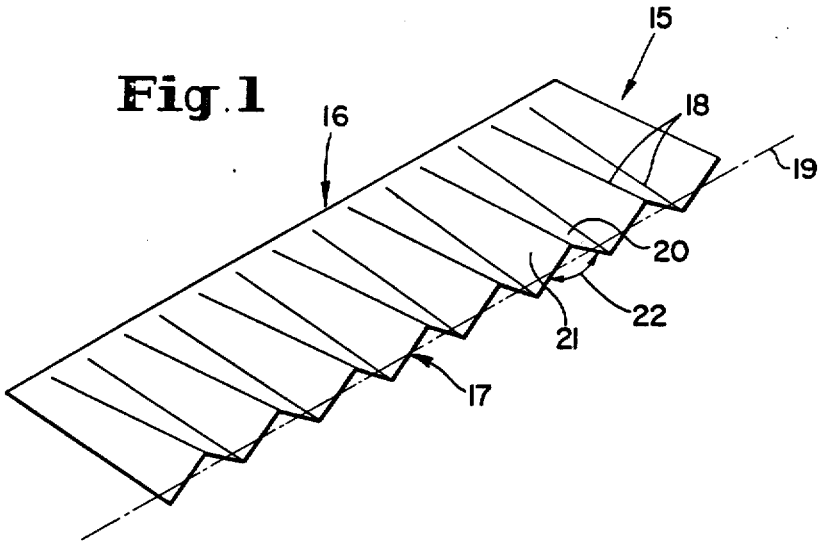
FIG. 1 is a perspective view of a plate to be laid in a fold between two part surfaces of the zig-zag folded filter material.

In order to now give the filter material, especially the part surfaces 12 and 13, the required rigidity and support, a plate, strip of material 15 formed according to the invention according to FIG. 1 is respectively placed in each fold, having a straight-formed edge 16 and the opposing edge 17 being zig-zag formed in such a way that the bend or crest lines 18 between the two edges 16 and 17 rise steadily towards the medial plane 19 of the plate 15. Through the specific zig-zag formed folding of the plate 15, which runs out towards the one straight edge 16 in the medial plane 19 of the plate 15, part surfaces 20 and 21 are formed which enclose an angle 22 in the area of the bend and crest lines 18, said angle being between about 90° and about 120°.

With such a formation of the plates 15 inserted in the folds 14 of the zig-zag folded filter material 11, channels are formed which steadily expands towards the delivery end of each of said folds 14 and which provide a flow-favorable discharge of the gas having passed through the filter material. Through the zig-zag folding of the plate 15 with the distinguished fold lines 18 the filter material lies only in line-form on the plate 15 supporting it so that there is practically no loss regarding the filter surface.

The plate 15 supporting the filter material 11 or the folds 14 of the filter material can be of any suitable material, e.g. strips of of thin metal sheet, but also of an inherently stable plastic material.

If need be, the plate 15 may be provided with a reinforcement along its straight edge 16. This reinforcement can, in the case of a metal plate, be formed by the flanged edge, or by a bead, particularly when the plate is of plastic material.

With the filter cartridges of the type in question, the zig-zag folded filter material is commonly supported on the discharge side, usually with a perforated sheet or grid. This support material is bound to impair the discharge of the gas having passed through the filter material, to a greater or lesser degree. This disadvantage can be avoided with the filter cartridge formed according to the invention if the plates 15 inserted in the folds 14 of the zig-zag folded filter material 11 are supported at their ends, at the rear zig-zag formed edge 17, by a flange which, for example, can be arranged on the top and bottom of the filter material of the filter cartridge. With such a formation there is no need for supporting the zig-zag folded filter material in the hitherto customary manner.

I claim:

1. A filter cartridge for filtering apparatuses for removing impurities from hot and/or highly pressurized flowing gases, with zig-zag formed, gas-penetrated filter material folded at acute angles, whose part surfaces caused by the folding, between the fold lines, are arranged in relatively close juxtaposition to each other, characterized in that: one thin-walled strip 15 is disposed and arranged in the spaces between each two adjacent part surfaces 12, 13 of the filter material 11, said thin-walled strip 15 having one straight-formed edge 16 lying in the inside of the fold 14 and one opposite lying zig-zag formed edge 17, *the zig-zag edge being straight lines to form sharp peaks,* and in that, relative to the medial plane 19 of said thin-walled strip 15, the bend or crest lines 18 rise steadily *as straight bend lines* from said one straight formed edge 16 toward the sharp peaks of said zig-zag formed edge, *whereby each said strip 15 engages the adjacent surfaces 12, 13 of the associated filter material fold solely by a line to surface engagement of each said straight bend line 18 with the surface of said associated filter material folds.*

2. A filter cartridge according to claim 1, characterized in that the part surfaces 20, 21 of the folds of the thin-walled strip 15, enclose an angle 22 between about 90° to about 120° in the area of the zig-zag formed edge 17.

3. A filter cartridge according to claim 1 or 2, characterized in that the thin-walled strips 15 are placed in the folds 14 open to the discharge side of the filter material 11.

4. A filter cartridge according to claim 1, characterized in that the thin-walled strips 15 are placed in the folds 14 open to the approach side of the filter material 11.

5. A filter cartridge according to claim 1, characterized in that the thin-walled strips 15 are placed in the folds 14 open to both the approach side and the discharge side of the filter material 11.

* * * * *